US011556262B2

(12) United States Patent
Heng et al.

(10) Patent No.: US 11,556,262 B2
(45) Date of Patent: Jan. 17, 2023

(54) EXTENT OPERATION PROCESSING

(71) Applicant: EMC IP Holding Company LLC, Hopkinton, MA (US)

(72) Inventors: Socheavy Heng, Framingham, MA (US); William C. Davenport, San Diego, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 183 days.

(21) Appl. No.: 17/067,064

(22) Filed: Oct. 9, 2020

(65) Prior Publication Data

US 2022/0113886 A1    Apr. 14, 2022

(51) Int. Cl.
*G06F 12/00*    (2006.01)
*G06F 3/06*    (2006.01)
*G06F 9/46*    (2006.01)
*G06F 11/14*    (2006.01)

(52) U.S. Cl.
CPC ............ *G06F 3/0644* (2013.01); *G06F 3/061* (2013.01); *G06F 3/0683* (2013.01); *G06F 9/466* (2013.01); *G06F 11/1451* (2013.01); *G06F 11/1471* (2013.01)

(58) Field of Classification Search
CPC ...... G06F 3/0644; G06F 3/061; G06F 3/0683; G06F 9/466; G06F 11/1451; G06F 11/1471
See application file for complete search history.

(56) References Cited

U.S. PATENT DOCUMENTS

| | | | |
|---|---|---|---|
| 8,977,826 B1* | 3/2015 | Meiri | G06F 11/2064 |
| | | | 711/159 |
| 9,513,829 B1* | 12/2016 | Wang | G06F 16/2343 |
| 9,645,932 B1 | 5/2017 | Bono et al. | |
| 9,720,596 B1 | 8/2017 | Bono et al. | |
| 9,880,762 B1 | 1/2018 | Armangau et al. | |
| 9,984,112 B1 | 5/2018 | Wang et al. | |
| 10,740,187 B1 | 8/2020 | Prabhakar et al. | |
| 10,922,277 B1 | 2/2021 | De Souter et al. | |
| 11,058,299 B2 | 7/2021 | Rafaeli et al. | |
| 2013/0179730 A1* | 7/2013 | Jeong | G06F 11/1482 |
| | | | 714/20 |

* cited by examiner

*Primary Examiner* — Shawn X Gu
(74) *Attorney, Agent, or Firm* — BainwoodHuang (57) ABSTRACT

Successful storing of extent operations into corresponding records of a transaction log results in acknowledgement of completion of the extent operations being indicated to one or more hosts. In response to determining that the extent operations are unrelated to each other, the extent operations are flushed in parallel from the transaction log to back-end non-volatile data storage. During the flushing, dependencies between the extent operations and other operations stored in the transaction log are maintained. Dependency chains are identified within the transaction log, and at least one tree data structure representing the dependencies between each of the extent operations and the other operations stored in the transaction log may be generated and traversed in order to select the correct operations stored in the transaction log to flush.

13 Claims, 9 Drawing Sheets

EXTENT OPERATION PROCESSING

TECHNICAL FIELD

The present disclosure relates generally to intelligent data storage systems that process operations performed on extents of non-volatile data storage ("extent operations"), and more specifically to technology for processing extent operations using a transaction log, with parallel flushing of unrelated extent operations from the transaction log.

BACKGROUND

Data storage systems are arrangements of hardware and software that may include one or more storage processors coupled to non-volatile data storage drives, such as solid state drives and/or magnetic disk drives. Each storage processor may service host I/O requests received from physical and/or virtual host machines ("hosts"). The host I/O requests received by the storage processor may specify one or more storage objects (e.g. logical units ("LUNs"), and/or files, etc.) that are hosted by the storage system and store user data that is written and/or read by the hosts. Each storage processor executes software that processes host I/O requests and performs various data processing tasks to organize and secure the user data that is received from the hosts and stored in the non-volatile data storage drives of the data storage system.

While processing host I/O requests that read and write user data stored in the non-volatile data storage of the data storage system, some data storage systems perform operations on units of non-volatile data storage referred to as "extents." Each extent may be a logically contiguous portion of a shared logical address space, and may consist of and/or include at least a portion of a data storage volume or logical drive. An extent operation is an operation that is performed on one or more extents. For example, creation of a point in time copy of a unit of data (sometimes referred to as creating a "snapshot" of the data) may be performed as an extent operation, e.g. an extent copy operation from a parent extent to a child extent that provides a point in time copy of the parent extent. Another example of an extent operation may be deletion of the point in time copy, which may be performed as an extent delete operation. Other specific operations may also be performed on or using one or more extents.

SUMMARY

Processing of individual extent operations by previous data storage systems has been performed completely in-line, e.g. by one or more foreground processes, prior to indicating the completion of the extent operations to a requesting host. Such foreground, in-line processing of extent operations has at times resulted in significant delays before the successful completion of the extent operations and/or other related operations could be acknowledged to the host.

To address the above described and/or other shortcomings of previous technology, new technology is disclosed herein that stores multiple extent operations into corresponding records of a transaction log, and then indicates successful completion of each of the extent operations to one or more hosts in response to the successful storage of the extent operations into the corresponding records of the transaction log.

In another aspect, the disclosed technology determines that the multiple extent operations stored in the transaction log are unrelated to each other. In response to determining that the extent operations are unrelated to each other, the extent operations are flushed in parallel from the transaction log to back-end non-volatile data storage.

In another aspect, the disclosed technology maintains dependencies between the multiple extent operations and one or more other operations that are also stored in the transaction log while flushing the multiple extent operations in parallel from the transaction log to the back-end non-volatile data storage.

In another aspect, the disclosed technology maintains the dependencies between the extent operations and the other operations that are also stored in the transaction log at least in part by identifying dependency chains within the transaction log. Each one of the dependency chains may include one of the extent operations, and each one of the dependency chains may represent dependencies between the extent operation in the dependency chain and at least one other operation stored in the transaction log.

In another aspect, the disclosed technology maintains the dependencies between multiple extent operations and the other operations stored in the transaction log at least in part by generating at least one tree data structure representing the dependencies between each of the extent operations and other operations stored in the transaction log.

In another aspect, the disclosed technology further maintains the dependencies between the multiple extent operations and other operations stored in the transaction log further at least in part by traversing the at least one tree data structure while flushing the plurality of extent operations in parallel from the transaction log to the back-end non-volatile data storage in order to select the operations in the transaction log to flush.

Embodiments of the disclosed technology may provide significant advantages over previous technical solutions. For example, because an extent operation may be considered committed after the extent operation is successfully stored into a record of the transaction log, the acknowledgement of completion of the extent operation can be more rapidly conveyed back to a host that issued the operation, e.g. by transmitting an acknowledgement message back to the host that issued a request that caused the extent operation to be performed. In addition, the improved parallelization provided by the disclosed technology during the flushing of operations from the transaction log may improve I/O performance and resource utilization within the data storage system.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed upon illustrating the principles of the disclosed technology.

DETAILED DESCRIPTION

Embodiments of the invention will now be described with reference to the figures. The embodiments described herein are provided only as examples, in order to illustrate various features and principles of the disclosed technology, and the invention is broader than the specific embodiments described herein.

Embodiments of the technology disclosed herein may provide improvements over previous technologies by rapidly acknowledging completion of extent operations to hosts, and increasing parallelization during flushing of operations from a transaction log. In the disclosed technology, indications of successful completion of individual extent operations are provided to one or more hosts in response to the extent operations being successfully stored into corresponding records of a transaction log. The extent operations may include copy extent and delete extent operations. In response to a determination that multiple extent operations are unrelated to each other, the extent operations may be flushed in parallel from the transaction log to back-end non-volatile data storage. Dependencies are maintained between the multiple extent operations and one or more other operations that are also stored in the transaction log while the multiple extent operations are flushed in parallel from the transaction log to back-end non-volatile data storage, at least in part by identifying dependency chains within the transaction log. At least one tree data structure may be generated to represent the dependencies between the extent operations and the other operations stored in the transaction log. The tree may be traversed while the multiple extent operations are flushed in parallel from the transaction log to the back-end non-volatile data storage, in order to select operations to be flushed.

Figure 1:
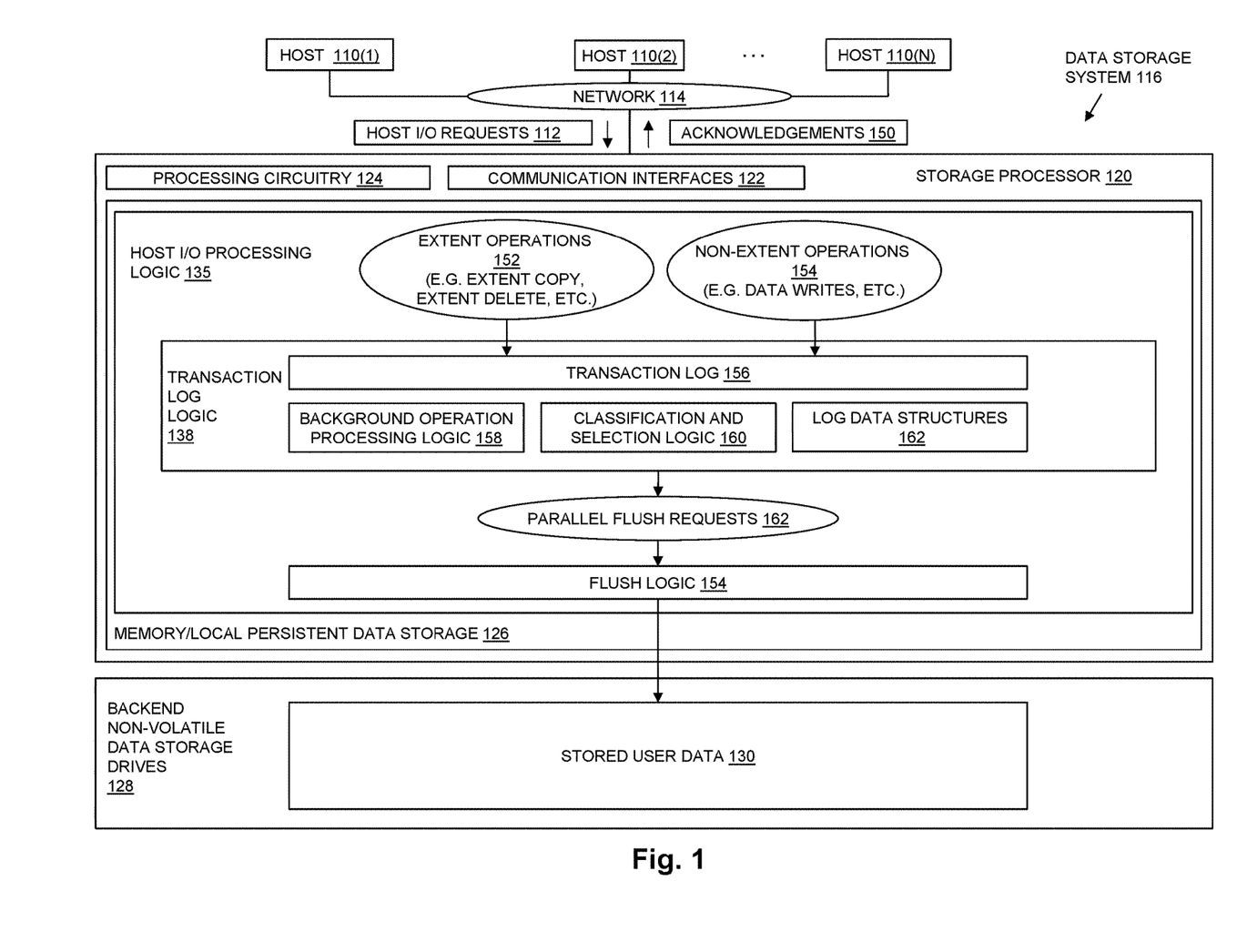
FIG. 1 is a block diagram showing an example of a data storage system in which an example of the disclosed technology is embodied.

FIG. 1 is a block diagram showing an operational environment for the disclosed technology, including an example of a data storage system in which the disclosed technology is embodied. FIG. 1 includes some number of physical and/or virtual Host Computing Devices 110, referred to as "hosts" and shown for purposes of illustration by Hosts 110(1) through 110(N). The hosts access data storage provided by Data Storage System 116, for example over one or more networks, such as a local area network (LAN), and/or a wide area network (WAN) such as the Internet, etc., and shown for purposes of illustration in FIG. 1 by Network 114. Data Storage System 116 includes at least one Storage Processor 120 that is communicably coupled to Network 114, and Backend Non-Volatile Data Storage Drives 128, e.g. though one or more Communication Interfaces 122. No particular hardware configuration is required, and Storage Processor 120 may be embodied as any specific type of device that is capable of processing host input/output (I/O) requests received from Hosts 110 (e.g. I/O read and I/O write requests, etc.) and persistently storing data received from the Hosts 110.

The Backend Non-Volatile Data Storage Drives 128 may include physical data storage drives such as solid state drives, magnetic disk drives, hybrid drives, optical drives, and/or other specific types of drives. Backend Non-Volatile Data Storage Drives 128 may be directly physically connected to and/or contained within Storage Processor 120, and/or may be communicably connected to Storage Processor 120 by way of one or more networks.

A Memory/Local Persistent Data Storage 126 in Storage Processor 120 stores program code that is executable on Processing Circuitry 124. Memory 126 may include volatile memory, e.g. DRAM. Memory/Local Persistent Data Storage 126 may also include one or more persistent physical data storage devices that are physically separate and independent from Backend Non-Volatile Data Storage Drives 128. Such persistent data storage devices in Memory/Local Persistent Data Storage 126 may include a battery-backed memory (e.g. a battery-backed RAM (Random Access Memory)) that is contained in and/or communicably coupled to Storage Processor 120, and/or some other specific type of persistent data storage. The contents of the persistent data storage devices in Memory/Local Persistent Data Storage 126 may be preserved when power to Data Storage System 116 is shut off. In some embodiments, the total data storage capacity of the persistent data storage devices in Memory/Local Persistent Data Storage 126 may be less than the total data storage capacity of Backend Non-Volatile Data Storage Drives 128.

Processing Circuitry 124 may, for example, include or consist of one or more microprocessors, e.g. central processing units (CPUs), multi-core processors, chips, and/or assemblies, and associated circuitry. Processing Circuitry 124 and Memory/Local Persistent Data Storage 126 together form control circuitry, which is configured and arranged to carry out various methods and functions as described herein. The Memory/Local Persistent Data Storage 126 stores a variety of software components that may be provided in the form of executable program code. For example, Memory/Local Persistent Data Storage 126 may store software components such as Host I/O Processing Logic 135. When program code stored in Memory/Local Persistent Data Storage 126 is executed by Processing Circuitry 124, Processing Circuitry 124 is caused to carry out the operations of the software components. Although certain software components are shown in the Figures and described herein for purposes of illustration and explanation, those skilled in the art will recognize that Memory/Local Persistent Data Storage 126 may include various other software components, such as an operating system, various applications, other specific processes, etc.

During operation, while processing Host I/O Requests 112, Host I/O Processing Logic 135 performs Extent Operations 152 and Non-Extent Operations 154. Extent Operations 152 include operations performed on extents. Each extent may be a logically contiguous, multi-page portion of a shared logical address space, and may consist of and/or include at least a portion of a data storage volume or logical drive. Each operation in Extent Operations 152 may be performed on one or more extents.

In some embodiments, Extent Operations 152 include one or more copy extent operations that each create a point in time copy of a unit of data (e.g. create a "snapshot" of a data object). In some embodiments, Extent Operations 152 may also include one or more delete extent operations that each delete a point in time copy of a unit of data (e.g. delete a "snapshot" of a data object).

Non-Extent Operations 154 include operations other than extent operations. Non-Extent Operations 154 may include data write operations that are performed on specific pages located within specific extents.

In the example of FIG. 1, Transaction Log Logic 138 includes Transaction Log 156, Background Operation Processing Logic 158, Classification and Selection Logic 160, and Log Data Structures 162. During operation, Transaction Log Logic 138 stores Extent Operations 152 into corresponding records of Transaction Log 156. Transaction Log 156 may be contained wholly or partly within the persistent data storage devices of Memory/Local Persistent Data Storage 126. When Transaction Log Logic 138 stores each one of Extent Operations 152 into the corresponding one of the records in Transaction Log 156, Transaction Log Logic 138 stores metadata that is sufficient for Background Operation Processing Logic 158 to complete each operation in the corresponding record.

In response to each one of Extent Operations 152 being successfully stored into the corresponding record within Transaction Log 156, Host I/O Processing Logic 135 indicates successful completion of the operation to one of the Hosts 110, e.g. by transmitting an acknowledgement to one of Hosts 110 that issued a host I/O request that caused the extent operation to be performed, as shown by Acknowledgements 150.

After each one of the Extent Operations 152 is successfully stored into the corresponding record within Transaction Log 156, Background Operation Processing Logic 158 performs the extent operation. After Background Operation Processing Logic 158 performs an extent operation, an indication that the extent operation has been completed is stored, e.g. within a record in Transaction Log 156, and the operation is then ready to be flushed from Transaction Log 156, e.g. in parallel with one or more other unrelated extent operations that have also been completed.

Transaction Log Logic 138 also stores Non-Extent Operations 154 into corresponding records of Transaction Log 156. When Transaction Log Logic 138 stores each one of the Non-Extent Operations 154 into the corresponding one of the records in Transaction Log 156, Transaction Log Logic 138 stores metadata that is sufficient for Background Operation Processing Logic 158 to complete the operation in the corresponding record. In response to each one of Non-Extent Operations 154 being successfully stored into the corresponding record within Transaction Log 156, Host I/O Processing Logic 135 indicates successful completion of the operation to one of the Hosts 110, e.g. by transmitting an acknowledgement to one of Hosts 110 that issued a host I/O request that caused the non-extent operation to be performed, as shown by Acknowledgements 150. After each one of Non-Extent Operations 154 is successfully stored into the corresponding record within Transaction Log 156, Background Operation Processing Logic 158 performs the non-extent operation. After Background Operation Processing Logic 158 performs a non-extent operation, an indication that the non-extent operation has been completed is stored, e.g. within a record in Transaction Log 156, and the operation is then ready to be flushed from Transaction Log 156, e.g. in parallel with one or more other non-extent and/or extent operations that have also been completed.

Further during operation, Transaction Log Logic 138 determines that multiple extent operations stored Transaction Log 156 are unrelated to each other. Such a determination may, for example, be performed by Classification and Selection Logic 160. In response to determining that the extent operations are unrelated to each other, after the extent operations are completed by Background Processing Logic 158, Transaction Log Logic 138 flushes the extent operations in parallel from Transaction Log 156 to Backend Non-Volatile Data Storage Drives 128. For example, Transaction Log 156 may issue multiple parallel requests to Flush Logic 154 to flush extent operations from Transaction Log 156 to Backend Non-Volatile Data Storage Drives 128, as shown by Parallel Flush Requests 162. Flush Logic 154 flushes the completed extent operations from Transaction Log 156 by moving the data that is written by each of the completed operations from Memory/Local Persistent Data Storage 126 to corresponding physical locations within Backend Non-Volatile Data Storage Drives 128, as shown in FIG. 1 by Stored User Data 130.

Classification and Selection Logic 160, in combination with Transaction Log 156 and Log Data Structures 162, maintains dependencies between multiple extent operations and one or more other extent and/or non-extent operations that are also stored in Transaction Log 156 while flushing the extent operations in parallel from Transaction Log 156 to Backend Non-Volatile Data Storage Drives 128.

In some embodiments, Classification and Selection Logic 160, in combination with Transaction Log 156 and Log Data Structures 162, maintains the dependencies between extent operations and other extent and/or non-extent operations that are also stored in Transaction Log 156 at least in part by identifying dependency chains within Transaction Log 156. Each one of the dependency chains may include one or more extent operations, and each one of the dependency chains may represent dependencies between the extent operation in the dependency chain and at least one other extent or non-extent operation stored in the Transaction Log 156.

In some embodiments, Classification and Selection Logic 160, in combination with Transaction Log 156 and Log Data Structures 162, maintains the dependencies between extent operations and other extent and/or non-extent operations that are also stored in Transaction Log 156 at least in part by generating at least one tree data structure in Log Data Structures 162 representing the dependencies between each of the plurality of extent operations and other operations stored in the Transaction Log 156.

In some embodiments, Classification and Selection Logic 160, in combination with Transaction Log 156 and Log Data Structures 162, maintains the dependencies between extent operations and other extent and/or non-extent operations that are also stored in Transaction Log 156 at least in part by traversing at least one tree data structure in Log Data Structures 162 while flushing extent operations in parallel from the transaction log to the Backend Non-Volatile Data Storage Drives 128 in order to select the records in the Transaction Log 156 from which operations are to be flushed.

Figure 2:
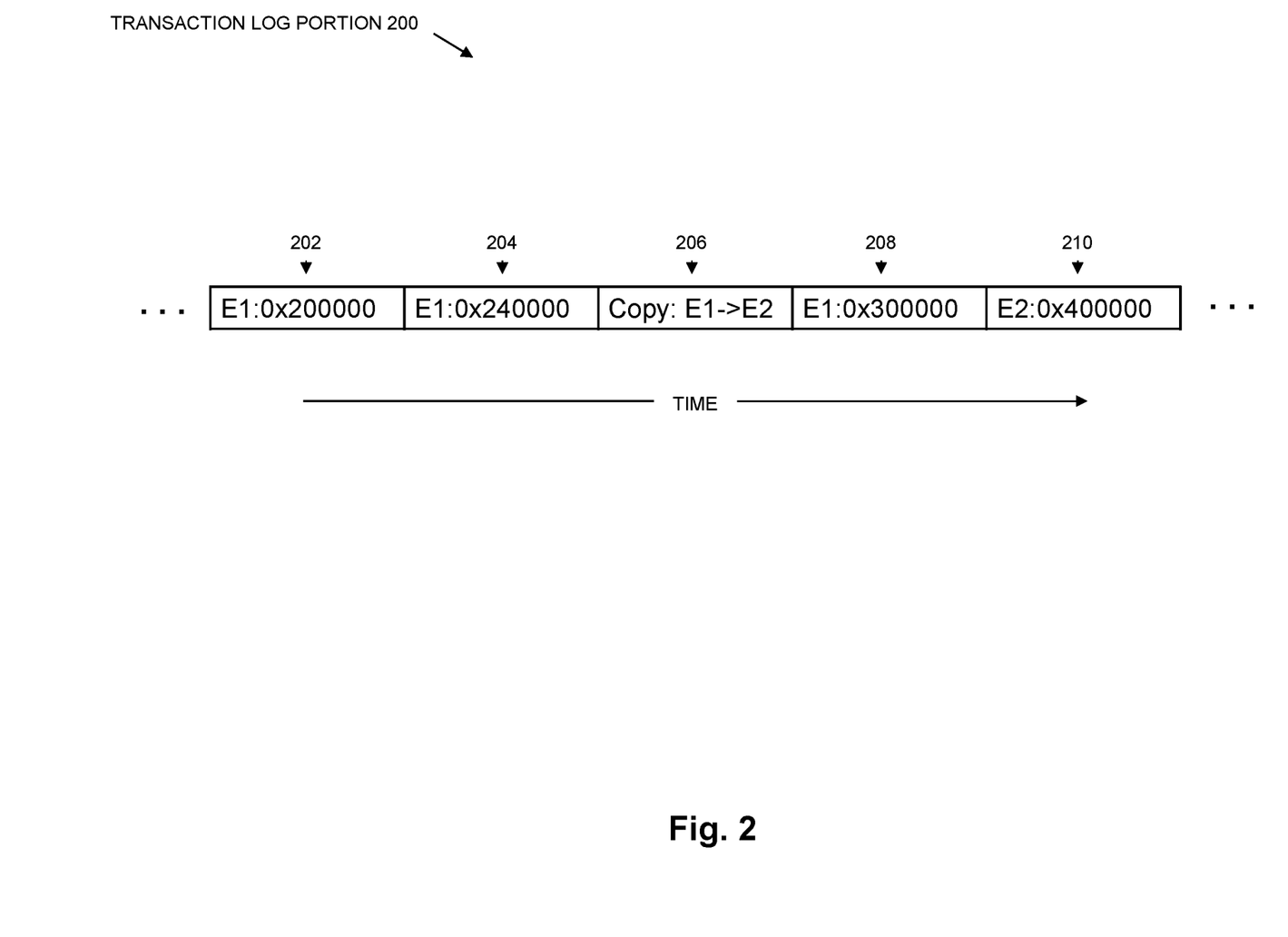
FIG. 2 is a block diagram showing an example of a portion of a transaction log including a dependency chain.

FIG. 2 is a block diagram showing an example of a portion of a transaction log including a dependency chain, e.g. Transaction Log Portion 200. As shown in FIG. 2, records are added to Transaction Log Portion 200 temporally from left to right, such that records to the right are more recently added than records to the left. The Transaction Log Portion 200 of FIG. 2 contains a single example of a dependency chain spanning multiple records. A record 202 stores a write operation directed to the page located at the offset 0x200000 within extent E1, a record 204 stores a write operation directed to the page located at the offset 0x240000 within extent E1, a record 206 stores an extent copy operation that copies the contents of extent E1 (which may be either pointers to data or data) to extent E2, a record 208 stores a write operation directed to the page located at the offset 0x300000 within extent E1, and a record 210 stores a write operation directed to the page located at the offset 0x400000 within the extent E2. In the dependency chain shown in FIG. 2, the write operation directed to the page located at offset 0x200000 in the extent E1 and the write operation directed to the page located at offset 0x240000 within extent E1 are both flushed out of the transaction log before the copy of the extent E1 to the extent E2, so that E2 after the flush of the extent copy will reflect the result of those two write operations to E1. In addition, the copy of the extent E1 to E2 is flushed before the flushing of the write operation directed to the page located at offset 0x300000 in extent E1 and before the flushing of the write operation directed to the page located at offset 0x400000 in extent E2, so that E2 after the flush of the extent copy operation will not reflect either of those two write operations. Moreover, in the case where the extent copy of extent E1 to extent E2 creates a point in time copy of extent E1 in extent E2, extent E2 may not exist prior to the extent copy operation being performed, and accordingly the write to the page at offset 0x400000 in extent E2 cannot be performed and flushed until after the extent copy operation that copies E1 to E2 is performed and flushed.

Figure 3:
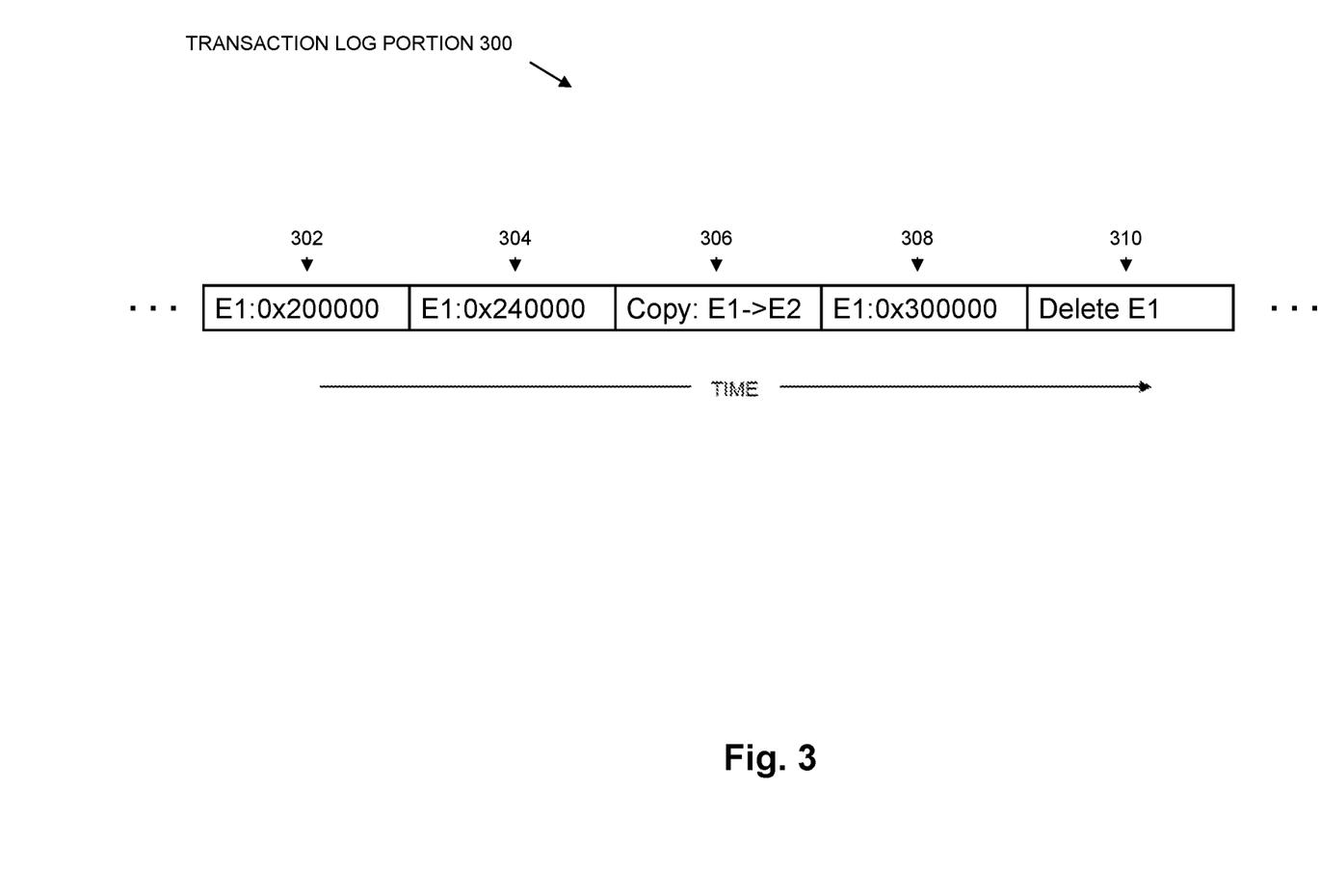
FIG. 3 is a block diagram showing an example of a portion of a transaction log including a dependency chain.

FIG. 3 is a block diagram showing another example of a portion of a transaction log including a dependency chain, e.g. Transaction Log Portion 300. The records in Transaction Log Portion 300 are also added temporally from left to right, and Transaction Log Portion 300 of FIG. 3 also contains a single dependency chain spanning multiple records. A record 302 stores a write operation directed to the page located at the offset 0x200000 within extent E1, a record 304 stores a write operation directed to the page located at the offset 0x240000 within extent E1, a record 306 stores an extent copy operation that copies the contents of extent E1 (which may be pointers to data or data) to extent E2, a record 308 stores a write operation directed to the page located at the offset 0x300000 within extent E1, and a record 310 stores an extent delete operation that deletes the extent E1. In the dependency chain shown in FIG. 3, the write operation directed to the page located at offset 0x200000 in the extent E1 and the write operation directed to the page located at offset 0x240000 within extent E1 are both flushed out of the transaction log before the copy of the extent E1 to the extent E2, so that E2 after the flush of the extent copy operation will reflect the result of those two write operations to E1. In addition, the copy of extent E1 to extent E2 is flushed prior to both the write to the page at offset 0x300000 in E1 and the deletion of E1. Further, the write to the page at offset 0x300000 in E1 may be invalidated based on the extent delete operation performed on E1 that is stored in the following record.

Figure 4:
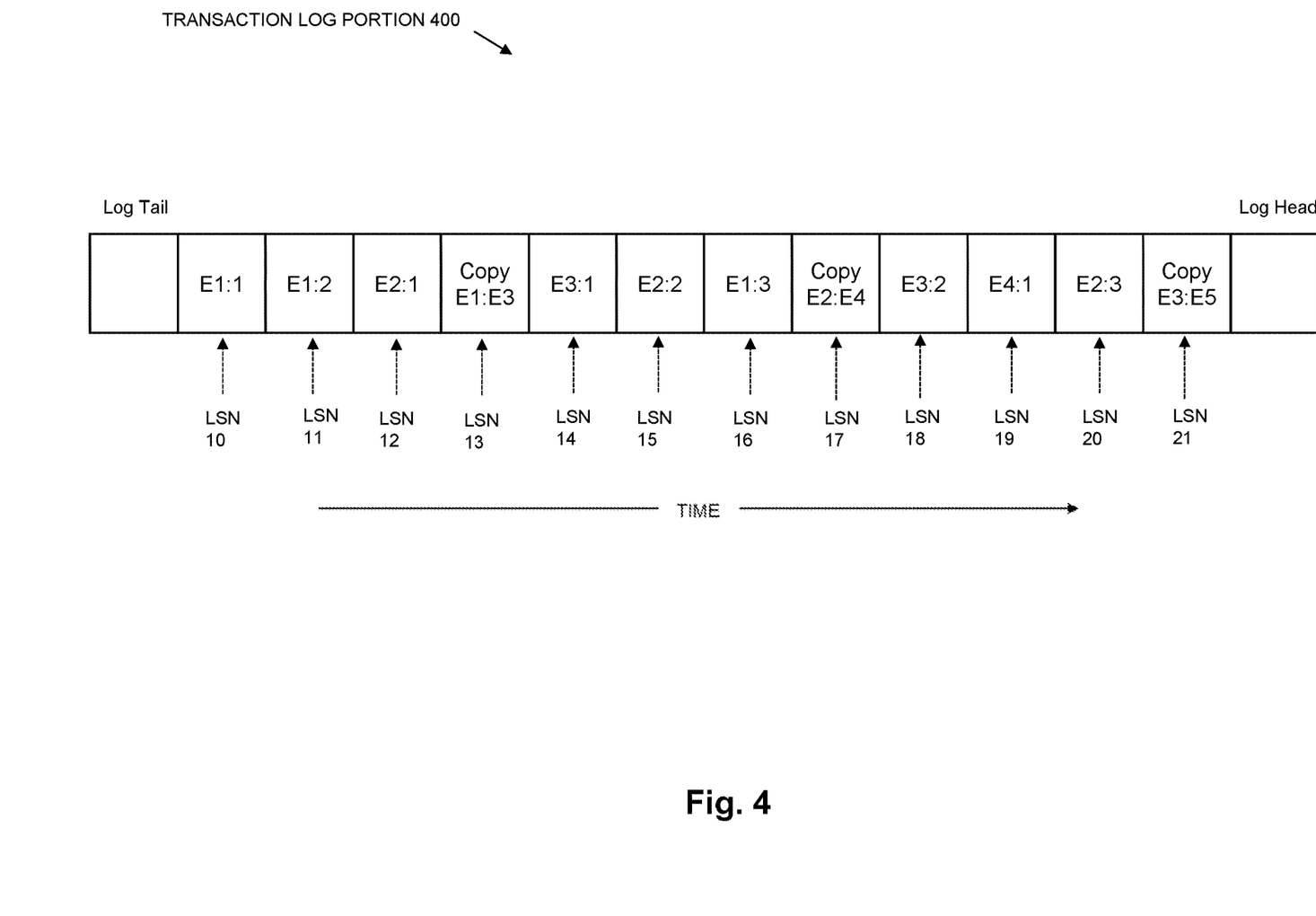
FIG. 4 is a block diagram showing an example of a portion of a transaction log including multiple dependency chains.

FIG. 4 is a block diagram showing an example of a portion of a transaction log including multiple dependency chains, e.g. Transaction Log Portion 400. The records in Transaction Log Portion 400 are also added temporally from left to right, with new records being added at the Log Head and records being processed at the Log Tail. The Transaction Log Portion 400 may, for example, be part of a transaction log that is a circular or ring data structure. Each record in Transaction Log Portion 400 uniquely corresponds to a single Log Sequence Number (LSN). The LSNs are monotonically increasing, and the records in Transaction Log Portion 400 correspond to LSNs 10-21. In FIG. 4, data write operations are represented in the following format:

"Extent Number":"Number of write to same Extent"

Accordingly, in this format the data write "E1:1" is the first write to extent E1, the data write "E1:2" is the second write to extent E1, the data write "E1:3" is the third write to extent E1, and so on. Similarly, the data write "E2:1" is the first write to extent E2, the data write "E2:2" is the second write to extent E2, and so on. Data writes to the extents E3 and E4 are represented similarly.

A first dependency chain in Transaction Log Portion 400 is made up of the operations stored in the records corresponding to LSN 10, LSN 11, LSN 13, LSN 14, LSN 16, LSN 18, and LSN 21. A second dependency chain in Transaction Log Portion 400 is made up of the operations stored in the records corresponding to LSN 12, LSN 15, LSN 17, LSN 19, and LSN 20.

The extent operations in the two dependency chains shown in the Transaction Log Portion 400 are unrelated. Specifically, the extent copy operation that copies the contents of extent E1 to extent E3 and is stored in the record corresponding to LSN 13, and the extent copy operation that copies the contents of the extent E3 to extent E5 and is stored in the record corresponding to LSN 21, are unrelated to the extent copy operation in the second dependency chain that copies the contents of extent E2 to extent 4 and is stored in the record corresponding to LSN 17. The dependencies in the two dependency chains are therefore also unrelated. The two dependency chains may therefore be flushed in parallel by the disclosed technology. For example, the data writes E1:1 (stored at LSN 10), E1:2 (stored at LSN 11), E2:1 (stored at LSN 12), and E2:2 (stored at LSN 15) may be flushed in parallel by the disclosed technology. The extent copy operation stored at LSN 13 that copies the contents of extent E1 to extent E3, and the extent copy operation stored at LSN 17 that copies the contents of the extent E2 to extent E4 is then flushed in parallel thereafter. The data writes E3:1 (stored at LSN 14), E1:3 (stored at LSN 16), and E3:2 (stored at LSN 18) must be flushed before the extent copy operation stored at LSN 21 that copies the contents of extent E3 to extent E5. In addition, the data writes E4:1 (stored at LSN 19) and E2:3 (stored at LSN 20) may be flushed in parallel along with the data writes E3:1 (stored at LSN 14), E1:3 (stored at LSN 16), and E3:2 (stored at LSN 18) or the extent copy operation stored at LSN 21 that copies the contents of the extent E3 to the extent E5, since the operations are not related and there is no dependency between them. While the example of FIG. 4 shows only two dependency chains, those skilled in the art will recognize that larger numbers of chains may be identified, along with extent delete operations, and that additional opportunities for increased parallelism may thus be provided.

Figure 5:
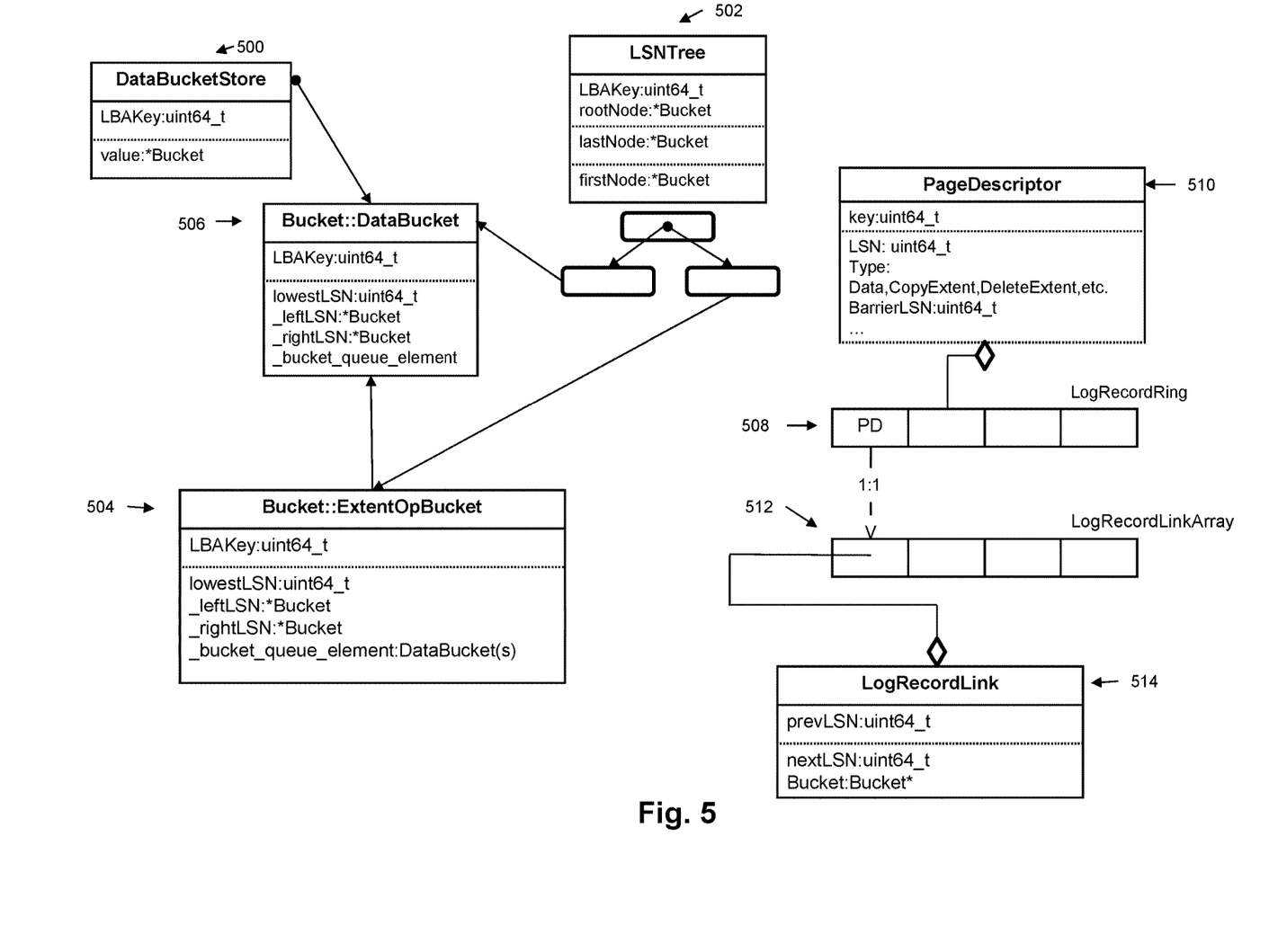
FIG. 5 is a block diagram showing an example of transaction log data structures in some embodiments.

FIG. 5 is a block diagram showing an example of transaction log data structures in some embodiments. The data structures shown in FIG. 5 may be contained in the Log Data Structures 162 shown in FIG. 1. The proper ordering of dependencies (i.e. between records in the transaction log storing dependent operations) while providing flushing parallelism is accomplished (e.g. through operation of Classification and Selection Logic 160) by classifying operations stored in records in the transaction log with additional Barrier LSNs within data structures referred to herein as "Buckets". DataBucket type Buckets may be placed into a DataBucketStore 500 and/or into an LSNTree 502. "ExtentOpBucket" type Buckets are placed into the LSNTree 502, and may contain chains of dependent "DataBucket" type Buckets.

For example, with reference to the Transaction Log Portion 400 shown in FIG. 4, the records storing the data writes E1:1 (the record at LSN 10), E1:2 (the record at LSN 11), and E2:1 (the record at LSN 12), store Barrier LSNs of 0, or a number less than 10 if there is a record storing an extent copy operation prior to those records. The record at LSN 16 storing the extent copy operation that copies the contents of extent E1 to the extent E3 stores a Barrier LSN of 11. The records that store the data write operations E3:1 (the record at LSN 14) and E1:3 (the record at LSN 16) store Barrier LSNs of 13, and so on.

Each Bucket defines a key for two trees, one key being an LBA (Logical Block Address) range of the Bucket, and the other key being a lowest LSN for the Bucket, which may be used for tail flushing efficiency. The LBA range of each Bucket can be defined in various granularities, such as 2 MB or 1 GB.

In the example of FIG. 5, there are two Bucket types, ExtentOpBucket Buckets 504 and DataBucket Buckets 506. Further in the example of FIG. 5, LogRecordRing 508 stores the records of the transaction log, with each record storing a PageDescriptor 510. Each PageDescriptor 510 stores details about the operation that is stored in the record (e.g. operation type, relevant metadata needed to perform the operation, etc.), and the Barrier LSN for the record. LogRecordLinkArray 512 is an array of LogRecordLinks 514, where each LogRecordLink 514 in LogRecordLinkArray 512 corresponds to one of the records in LogRecordRing 508, and links the PageDescriptors 510 within a DataBucket Bucket 506. Each DataBucket Bucket 506 is classified into the DataBucketStore 500 and either the LSNTree 502 or an ExtentOpBucket Bucket 504. The LBA range of each DataBucket Bucket 506 maintains localization, while the LSNTree 502 maintains flush priority for purposes of moving the log tail of the transaction log.

The disclosed technology operates such that the following properties are maintained:

1. A DataBucket Bucket 506 can be in the DataBucketStore 500 and/or either in the LSNTree 502 or chained upon an ExtentOpBucket Bucket 504.

2. Each DataBucket Bucket 506 that is a direct node of the LSNTree 502 can be flushed.

3. Each ExtentOpBucket Bucket 504 is always placed in the LSNTree 502 and may contain a chain of DataBucket Buckets 506.

4. Insertion of an ExtentOpBucket Bucket 504 may remove existing DataBucket Buckets 506 from the DataBucketStore 500 in order to maintain dependencies during flushing. The DataBucket Buckets 506 that are removed from the DataBucketStore 500 can be within a Bucket chain of an ExtentOpBucket Bucket 504 or within the LSNTree 502.

5. All ExtentOpBucket Buckets 504 within the LSNTree 502 are evaluated based on whether they are ready to be flushed.

6. Upon completion of the flush of an ExtentOpBucket Bucket 504, the Buckets that were dependent upon the extent operation in the ExtentOpBucket Bucket 504 are placed directly into the LSNTree 502 and are thereafter recognized as being ready to be flushed.

Classification of Records into the LSNTree and Dependencies

Figure 6:
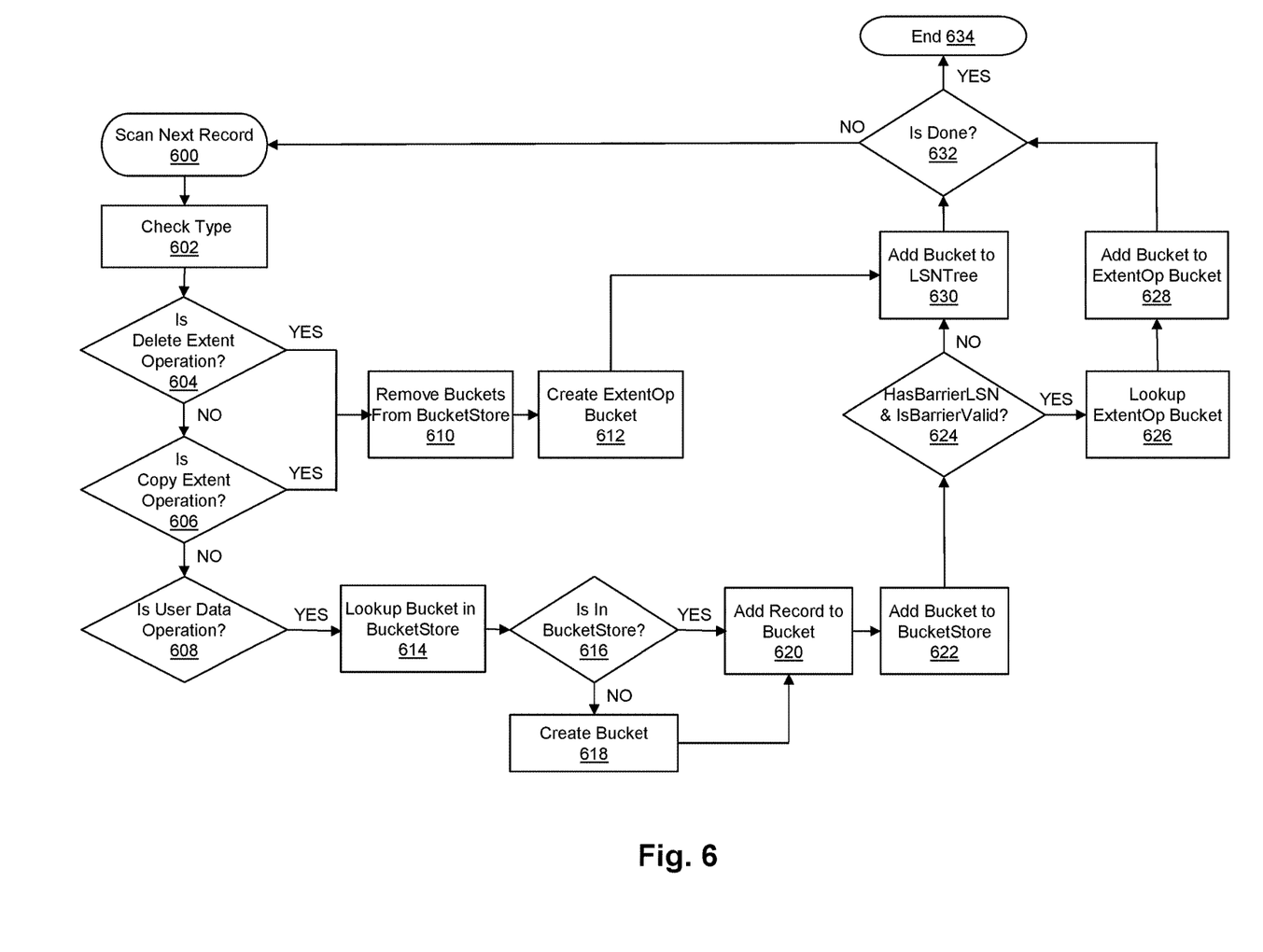
FIG. 6 is a flow chart showing an example of steps performed in some embodiments to perform classification.

In the disclosed technology (e.g. by operation of Classification and Selection Logic 160), each record in the transaction log storing an extent operation is assigned a Bucket (i.e. an ExtentOpBucket Bucket) with an LSN and placed within the LSNTree. However, the ExtentOpBucket Buckets do not get put into the DataBucketStore. A BarrierLSN is provided for each incoming PageDescriptor indicating whether there is a dependency on any operation stored in another record of the transaction log. The BarrierLSN allows the disclosed technology to determine whether an operation stored in a record is dependent upon another operation stored in another record. The BarrierLSN may be used to look up an extent operation's record, to determine the extent operation's validity, and the corresponding ExtentOpBucket Bucket. The organization of dependency provided by the disclosed technology is stored as a binary tree (e.g. the LSNTree), in which ExtentOpBucket Bucket nodes may contain a chain of dependent DataBucket Buckets. FIG. 6 illustrates how embodiments of the disclosed technology may scan records in the transaction log to classify operations stored in the records of the transaction log into Buckets. The steps of FIG. 6 may, for example, be performed by Classification and Selection Logic 160.

As shown in FIG. 6, at step 600, a next record in the transaction log is scanned. Step 600 is followed by step 602, in which the disclosed technology checks the operation type of the record. In step 604, the disclosed technology branches based on whether the operation stored in the record is an extent delete operation. If so, step 604 is followed by step 610. Otherwise, step 604 is followed by step 606.

In step 606, the disclosed technology branches based on whether the operation stored in the record is an extent copy operation. If so, step 606 is followed by step 610. Otherwise, step 606 is followed by step 608.

In step 608, the disclosed technology branches based on whether the operation stored in the record is a data write operation. If so, step 608 is followed by step 614.

In step 614, the disclosed technology looks in the DataBucketStore for a Bucket (i.e. a DataBucket Bucket) having an LBA range that includes the LBA to which the data write operation stored in the record is directed. For example, in some embodiments a corresponding a DataBucket Bucket may be found using the destination or target LBA indicated by the contents of the record and a corresponding Bucket LBA key.

In step 616, the disclosed technology branches based on whether a DataBucket Bucket was found in the DataBucketStore in which to represent the data write operation stored in the record. If so, step 616 is followed by step 620. Otherwise, step 616 is followed by step 618, in which a new DataBucket Bucket is created. Step 618 is followed by step 620.

In step 620, the operation stored in the record is added to the DataBucket Bucket that was either located in the DataBucketStore at step 614 or created at step 618. Step 620 is followed by step 622, in which the new or modified DataBucket Bucket is added to the DataBucketStore. Step 622 is followed by step 624, in which the disclosed technology determines whether the record has a BarrierLSN and whether the barrier is valid. For example, in some embodiments, the BarrierLSN is considered valid if it is not 0 and occurs after the log tail, and the barrier is deemed to be valid if an ExtentOpBucket Bucket record is not yet marked completed. If the record has a BarrierLSN and the barrier is valid, then step 624 is followed by step 626. Otherwise, step 624 is followed by step 626.

In step 626, the disclosed technology looks up the ExtentOpBucket Bucket to which the DataBucket Bucket is to be chained. For example, in some embodiments, at step 626 the barrier LSN may be used to locate the record storing the extent operation in the LogRecordRing and the corresponding ExtentOpBucket Bucket in the corresponding LogRecordLink in the LogRecordLinkArray.

Step 626 is followed by step 628, in which the disclosed technology adds the DataBucket Bucket to the chain of the ExtentOpBucket Bucket identified in step 626. Step 628 is followed by step 632. In step 632, the disclosed technology determines whether all records have been scanned. If so, step 632 is followed by step 634, where the process ends. Otherwise, step 632 is followed by step 600.

In step 630, the disclosed technology adds the Bucket (either DataBucket Bucket or ExtentOpBucket Bucket) as necessary to the LSNTree. Step 630 is followed by step 632.

In step 610, the disclosed technology may remove one or more DataBucket Buckets that are to be chained to the ExtentOpBucket Bucket from the DataBucketStore. For example, at step 610 the disclosed technology may examine the record to determine its validity. If the extent operation stored in the record has not yet been flushed, the disclosed technology may perform a lookup into the DataBucketStore to find the an appropriate DataBucket Bucket or create a new DataBucket Bucket to add to the chain of dependent Buckets of the extent operation.

In step 612, the disclosed technology may create the ExtentOpBucket Bucket for the extent operation, with the DataBucket Buckets obtained in step 610 chained thereto. For example, a new ExtentOpBucket Bucket may be created in step 612 for a record determined to be valid at step 610. If there is no BarrierLSN provided in the record, all DataBucket Buckets pertaining to the source extent of the extent operation (e.g. an extent copy operation) are removed from the DataBucketStore to ensure that no new data write operations are added to stale Buckets. New DataBucket Buckets pertaining to the LBA range of the source extent of an extent copy operation may be added to the ExtentOpBucket Bucket. In some embodiments, if a valid BarrierLSN is present, a parent ExtentOpBucket Bucket may be found using the BarrierLSN and the LogRecordLinkArray. A chain of dependent DataBucket Buckets within the parent ExtentOpBucket Bucket may be scanned and are likewise removed from the DataBucketStore. The new ExtentOpBucket Bucket may then be added to the parent ExtentOpBucket Bucket chain.

Step 612 is followed by step 630.

Figure 7:
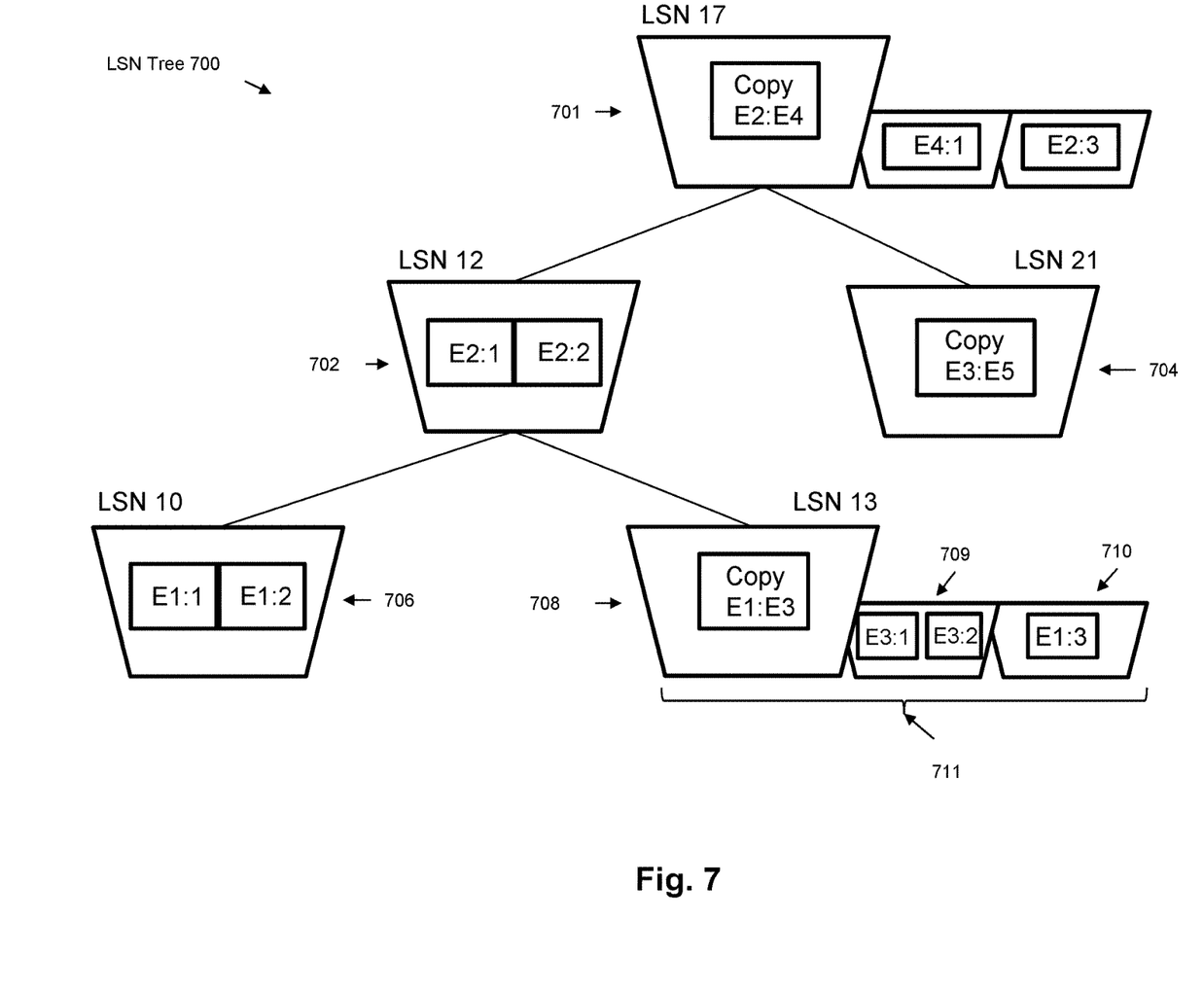
FIG. 7 is a block diagram showing an example representation of a Log Sequence Number (LSN) tree.

FIG. 7 shows an example of an LSN Tree 700, and illustrates an example of the disclosed classification process (e.g. as performed by Classification and Selection Logic 160), as applied to the example Transaction Log Portion 400 shown in FIG. 4. As shown in FIG. 7, the data write operation E1:1 is placed into a DataBucket Bucket 706 that also describes the lowest LSN of any operation in the bucket (e.g. LSN 10), the highest LSN, and an LBA key. The DataBucket Bucket 706 is placed into the LBA tree and LSN Tree 700. Data write operation E1:2 is then classified. In the case where E1:2 falls within the same LBA range as E1:1, it is also placed in DataBucket Bucket 706. However, alternatively, in the case where E1:2 does not fall into within the same LBA range as E1:1, a new DataBucket Bucket may be created, and then placed into the LBA tree and the LSN Tree 700. As further shown in FIG. 7, a new DataBucket Bucket 702 is also created for the data write operations E2:1 and E2:2 in the same manner.

As further shown in FIG. 7, an ExtentOpBucket Bucket 708 is created for the extent copy operation E1:E3. ExtentOpBucket Bucket 708 is not placed into the LBA tree, but is placed into the LSN Tree 700. The data write operation E3:1 is placed into a new DataBucket Bucket 709 that is placed into the LBA tree. Because E3:1 has a BarrierLSN of 13 (corresponding to the ring storing the extent copy operation E1:E3), it is placed in the dependency chain 711 that contains ExtentOpBucket 708, since it depends on the extent copy operation E1:E3 being flushed before it can be processed. DataBucket Bucket 709 is therefore not placed directly into the LSN Tree 700.

Selection and Flush

Figure 8:
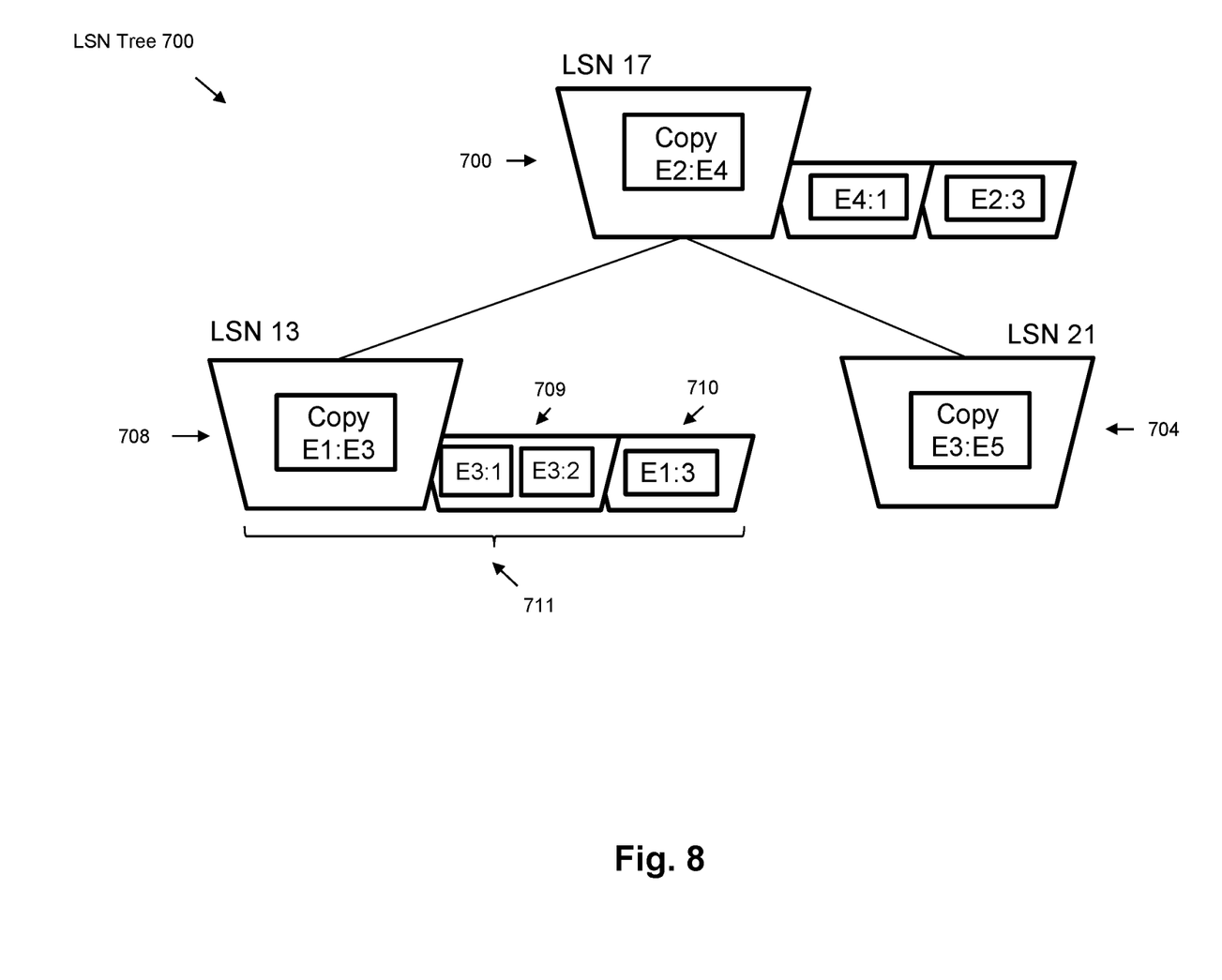
FIG. 8 is a block diagram showing another example representation of an LSN tree.
Figure 9:
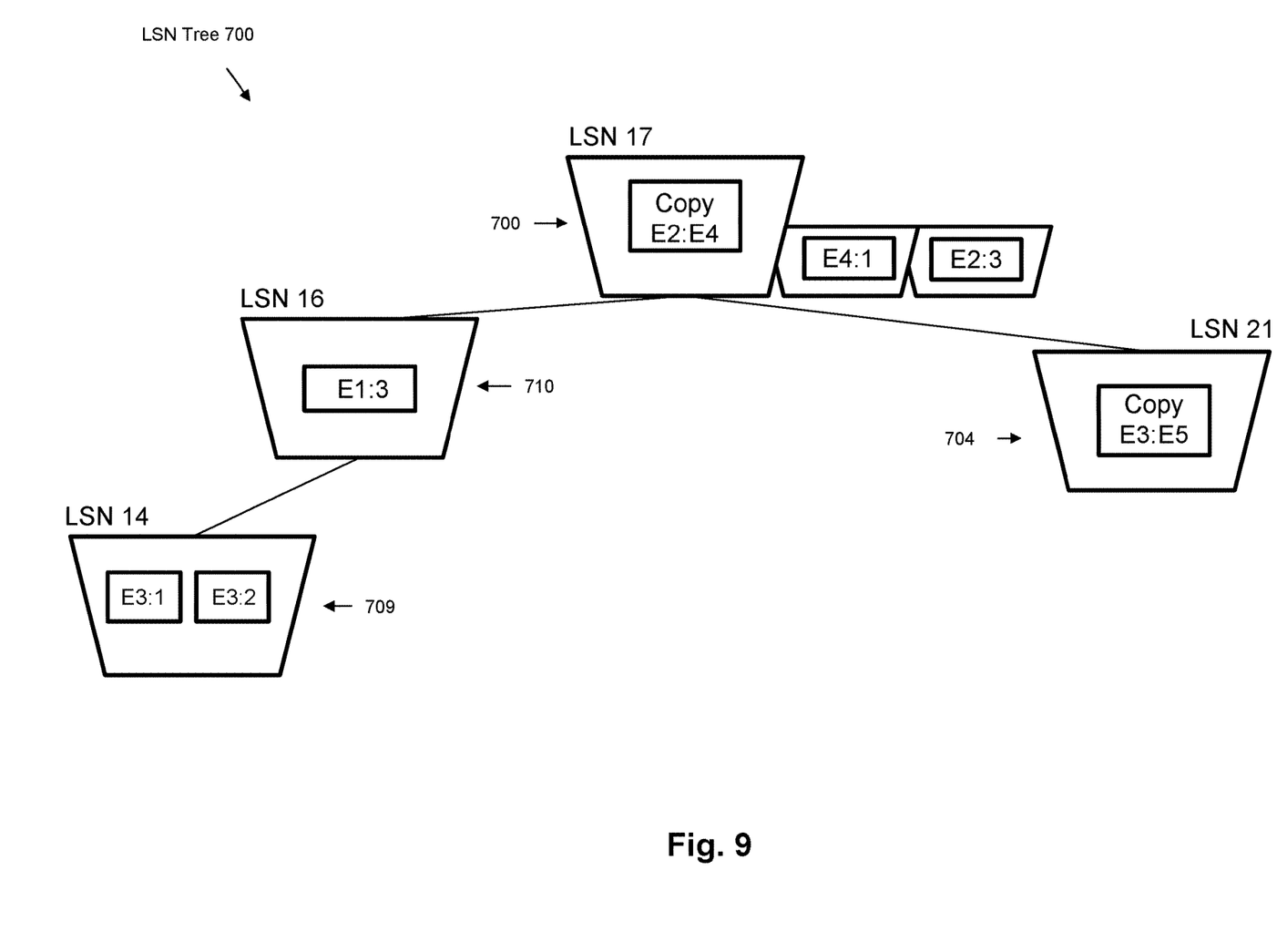
FIG. 9 is a block diagram showing a further example representation of an LSN tree.

During selection of operations to be flushed and the flushing of those operations (e.g. as performed by Classification and Selection Logic 160 based on the LSN Tree 700), the placement of DataBucket Buckets by the disclosed technology directly within the LSN Tree 700 indicates that there is no dependency and that the operations they contain can be flushed in parallel. During the selection process, Buckets that are placed in the LSN Tree 700 (e.g. Buckets 701, 702, 704, 706 and 708 in FIG. 7) undergo evaluation based on their BarrierLSN and the log tail. Buckets in the LSN Tree 700 are selected for flushing in LSN order to maintain priority of log tail movement. When an extent operation is flushed from a record, a "Done" record may be created for persistence in the transaction log through a commit sequence, in order to indicate completion of the extent operation. The corresponding "Done" record is processed on the commit of the record and the original record may then be invalidated. DataBucket Buckets in the chain of an ExtentOpBucket Bucket for the extent operation may then be promoted into direct nodes of the LSN Tree 700 to be flushed. FIGS. 8 and 9 illustrate how the completion of an extent copy operation (e.g. extent copy E1:E3) results in the removal of the ExtentOpBucket Bucket 708 from LSN Tree 700 and the promotion of the dependent DataBucket Buckets 709 and 710 so that they are stored directly within the LSN Tree 700.

FIG. 8 is a block diagram showing another example of the LSN Tree 700. As shown in FIG. 8, the data write operations E1:1 and E1:2 in DataBucket Bucket 706, and the data write operations E2:1 and E2:2 in DataBucket Bucket 701, have previously been flushed. Accordingly, the resulting LSN Tree 700 shown in FIG. 8 contains the ExtentOpBucket Buckets 700, 708, and 704. Since Buckets directly contained in the LSN Tree 700 are selected for flushing in order of their LSNs, with consideration of their BarrierLSNs, and the BarrierLSN for ExtentOpBucket Bucket 708 is LSN 11 indicating the record storing the data write E1:2, and since DataBucket Bucket 706 has now been flushed, the next extent operation selected for flushing in the example of FIG. 8 is the extent copy E1:E3 in ExtentOpBucket Bucket 708. It should be recognized that because the extent copy operations E1:E3 and E2:E4 are unrelated, that the BarrierLSN for ExtentOpBucket Bucket 701 is LSN 13, and that DataBucket Bucket 702 has now been flushed. Accordingly, the extent copy operation E2:E4 could also be flushed in parallel with the extent copy operation E1:E3. And it should also be recognized that the extent copy operation E3:E5 has a BarrierLSN of LSN 18, indicating the data write operation E3:2, which cannot be flushed until after the extent copy operation E1:E3 is flushed, and that accordingly the extent copy operation E3:E5 cannot be flushed in parallel with the extent copy operation E1:E3.

FIG. 9 is a block diagram showing a further example of the LSN Tree 700 after flushing of the extent copy operation E1:E3, resulting in the removal of ExtentOpBucket Bucket 708 from the LSN Tree 700, resulting in the promotion of the DataBucket Buckets 709 and 710 to Buckets that are directly contained in the LSN Tree 700. In the LSN Tree 700 as shown in FIG. 9, the data write operations in DataBucket Buckets 709 and 710, and the extent copy operations in ExtentOpBucket Buckets 700 and 704 can all be selected for flushing in parallel.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer PO attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:
1. A method comprising:
storing a plurality of extent operations into corresponding records of a transaction log;
in response to successfully storing the plurality of extent operations into the corresponding records of the transaction log, indicating successful completion of each of the plurality of extent operations to at least one host;
determining that the plurality of extent operations are unrelated to each other; and
in response to determining that the plurality of extent operations are unrelated to each other, flushing the plurality of extent operations in parallel from the transaction log to back-end non-volatile data storage;
wherein the flushing of the plurality of extent operations in parallel from the transaction log to back-end non-volatile data storage further comprises maintaining dependencies between the plurality of extent operations and other operations stored in the transaction log.

2. The method of claim 1, further comprising:
wherein maintaining the dependencies between the plurality of extent operations and other operations stored in the transaction log further comprises identifying a plurality of dependency chains within the transaction log, wherein each one of the dependency chains includes one of the plurality of extent operations, and wherein each one of the dependency chains represents dependencies between the one of the extent operations in the dependency chain and at least one other operation stored in the transaction log.

3. The method of claim 2, wherein maintaining the dependencies between the plurality of extent operations and the other operations stored in the transaction log further comprises generating at least one tree data structure representing the dependencies between each of the plurality of extent operations and the other operations stored in the transaction log.

4. The method of claim 3, wherein maintaining the dependencies between the plurality of extent operations and the other operations stored in the transaction log further comprises traversing the at least one tree data structure while flushing the plurality of extent operations in parallel from the transaction log to back-end non-volatile data storage to select records in the transaction log to flush.

5. The method of claim 1, wherein the plurality of extent operations includes at least one extent copy operation.

6. The method of claim 1, wherein the plurality of extent operations includes at least one extent delete operation.

7. A data storage system comprising:
at least one storage processor including processing circuitry and a memory;
a plurality of non-volatile data storage drives communicably coupled to the at least one storage processor; and
wherein the memory has program code stored thereon, wherein the program code, when executed by the processing circuitry, causes the processing circuitry to:
store a plurality of extent operations into corresponding records of a transaction log;
in response to successfully storing the plurality of extent operations into the corresponding records of the transaction log, indicate successful completion of each of the plurality of extent operations to at least one host;
determine that the plurality of extent operations are unrelated to each other; and
in response to a determination that the plurality of extent operations are unrelated to each other, flush the plurality of extent operations in parallel from the transaction log to back-end non-volatile data storage;
wherein the flush of the plurality of extent operations in parallel from the transaction log to back-end non-volatile data storage further comprises causing the processing circuitry to maintain dependencies between the plurality of extent operations and other operations stored in the transaction log.

8. The data storage system of claim 7, wherein the program code, when executed by the processing circuitry, further causes the processing circuitry to maintain the dependencies between the plurality of extent operations and other operations stored in the transaction log at least in part by causing the processing circuitry to identify a plurality of dependency chains within the transaction log, wherein each one of the dependency chains includes one of the plurality of extent operations, and wherein each one of the dependency chains represents dependencies between the one of the extent operations in the dependency chain and at least one other operation stored in the transaction log.

9. The data storage system of claim 8, wherein the program code, when executed by the processing circuitry, further causes the processing circuitry to maintain the dependencies between the plurality of extent operations and the other operations stored in the transaction log at least in part by causing the processing circuitry to generate at least one tree data structure representing the dependencies between each of the plurality of extent operations and the other operations stored in the transaction log.

10. The data storage system of claim 9, wherein the program code, when executed by the processing circuitry, further causes the processing circuitry to maintain the dependencies between the plurality of extent operations and the other operations stored in the transaction log at least in part by causing the processing circuitry to traverse the at least one tree data structure while flushing the plurality of extent operations in parallel from the transaction log to back-end non-volatile data storage to select records in the transaction log to flush.

11. The data storage system of claim 7, wherein the plurality of extent operations includes at least one extent copy operation.

12. The data storage system of claim 7, wherein the plurality of extent operations includes at least one extent delete operation.

13. A computer program product including a non-transitory computer readable medium having instructions stored thereon, wherein the instructions, when executed on processing circuitry, cause the processing circuitry to perform the steps of:
storing a plurality of extent operations into corresponding records of a transaction log;
in response to successfully storing the plurality of extent operations into the corresponding records of the transaction log, indicating successful completion of each of the plurality of extent operations to at least one host;
determining that the plurality of extent operations are unrelated to each other; and
in response to determining that the plurality of extent operations are unrelated to each other, flushing the plurality of extent operations in parallel from the transaction log to back-end non-volatile data storage;
wherein the flushing of the plurality of extent operations in parallel from the transaction log to back-end non-volatile data storage further comprises maintaining dependencies between the plurality of extent operations and other operations stored in the transaction log.

* * * * *